H. D. ROHMAN.
CAR LIGHTING SYSTEM.
APPLICATION FILED APR. 16, 1917.

1,369,128.

Patented Feb. 22, 1921.
2 SHEETS—SHEET 1.

WITNESS:

INVENTOR

ATTORNEYS.

H. D. ROHMAN.
CAR LIGHTING SYSTEM.
APPLICATION FILED APR. 16, 1917.

1,369,128.

Patented Feb. 22, 1921.
2 SHEETS—SHEET 2.

WITNESS:

INVENTOR
Harry D. Rohman
BY
ATTORNEYS.

UNITED STATES PATENT OFFICE.

HARRY D. ROHMAN, OF NEW YORK, N. Y., ASSIGNOR, BY MESNE ASSIGNMENTS, TO J. STONE & COMPANY, LIMITED, OF DEPTFORD, ENGLAND.

CAR-LIGHTING SYSTEM.

1,369,128.      Specification of Letters Patent.      Patented Feb. 22, 1921.

Application filed April 16, 1917. Serial No. 162,371.

*To all whom it may concern:*

Be it known that I, HARRY D. ROHMAN, a citizen of the Republic of Switzerland, residing at New York city, in the county of New York and State of New York, have invented certain new and useful Improvements in Car-Lighting Systems, of which the following is a specification.

This invention relates to electric systems such as are used for the lighting and heating of railway and other vehicles, and it has for one of its primary objects the provision of such a system in which improved means are provided for preventing overcharge of the battery, while at the same time the dynamo will supply the lamps, the output of the dynamo being proportionate to the load or demand of the consuming circuit or circuits. Another of the objects of the invention resides in an improved adaptation of the self-regulating dynamo shown in my copending application, Serial Number 63,869, filed November 27, 1915, to a car lighting system.

The foregoing, together with such other objects as may hereinafter appear, or are incident to my invention, I obtain by means of a system illustrated in diagrammatic form in the accompanying drawings, wherein—

Figure 1:
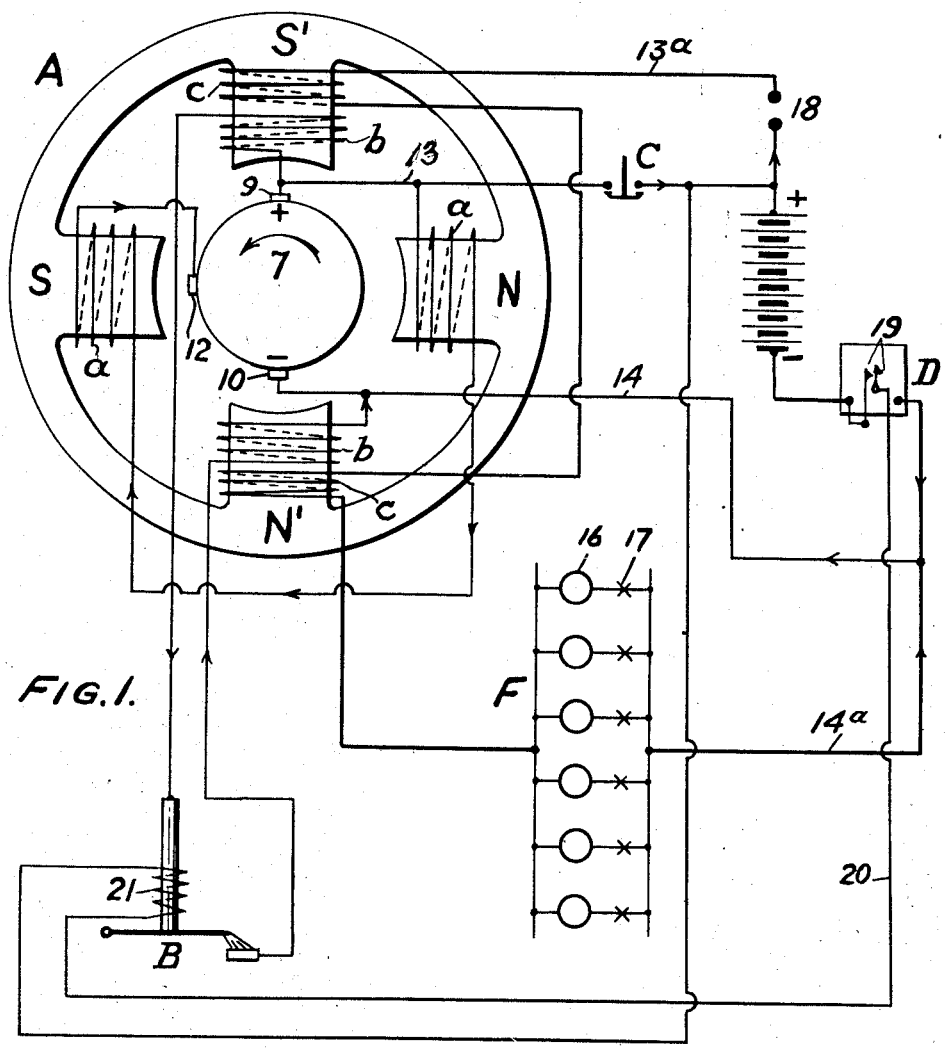
Figure 2:
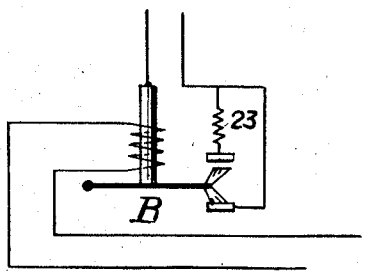

Figure 1 is a diagram of one form of my improvement; Fig. 2 is a detail modification thereof; and Fig. 3 a diagram of another modification of my invention.

In carrying out my invention, as hereinbefore indicated, I employ a generator of the type shown in the aforesaid application, namely, a generator having regulating poles provided with regulating coils adapted to assist or oppose the armature reaction and therefore modify the output of the dynamo, in direct proportion to the load of the consuming circuit or circuits. Stated in other words, the dynamo has regulating poles and regulating pole windings which automatically decrease or increase the output of the dynamo in direct proportion to the demands of the external circuit, without the interposition of any automatic electrical regulating mechanism such as is ordinarily employed in car lighting systems built around a variable or free speed dynamo, or the mechanical output controlling means such as is employed in systems built around speed controlled dynamos, such for example as the slipping belt dynamo, and this regardless of train speed. Heretofore it has been customary in free speed and speed controlled systems to regulate the current or the voltage or the wattage, and to prevent overcharging of the batteries by automatically inserting into the main field of the dynamo a resistance. In the present invention I propose to modify the regulating pole field instead of the main field, and in the embodiment shown I either break the circuit of the regulating pole windings or insert a resistance in certain of the windings of the regulating poles, the effect of which will be hereinafter pointed out.

For a complete description of the construction and operation of the regulating pole dynamo, attention is directed to the aforesaid co-pending application, it being sufficient for the purposes of this specification to briefly set forth the construction and operation as follows: The dynamo A, which in the present instance is shown as being of the two pole type, has main poles N and S and a pair of regulating poles N' and S'. The armature is indicated at 7; the positive and negative main collecting brushes are indicated at 9 and 10 respectively; 13 is the positive lead; E is the battery; 14 is the negative or return lead; $a$ are shunt windings for setting up the main field, such windings being connected across the positive 13 and a third or auxiliary brush 12; $b$ represents the shunt windings for the regulating poles N' and S', such windings being in shunt across the brushes 9 and 10, the circuit of such windings being normally completed through the relay switch B hereinafter to be described; F represents one group of any number of groups of translating devices such as lamps 16, the various lamps being controlled by switches 17; $13^a$ is the positive lead to the lamps, such lead being given a few series turns $c$ on the regulating poles N' and S'; $14^a$ indicates a negative return from the lamps, such return being connected to the negative 14.

Briefly, in operation the shunt field begins to build up as the armature 7 rotates, and when the dynamo develops a voltage equal to or greater than that of the battery E, the automatic cut-in switch C, which may be of any preferred type, closes and current will charge the battery E and supply the lamps if the lamps be on. As the speed of the armature increases in direct proportion to the train speed, the armature reaction and field distortion would increase, in a well-known manner, but current passes through the shunt windings *b* of the regulating poles, such current being in proportion to the speed of the armature. The current passing through the windings *b* increases the M. M. F. of the poles N' and S', which M. M. F. opposes the armature reaction field and cuts down the amount of distortion, the effect of which is to hold up the output of the dynamo. In the absence of such regulating poles and windings, the tendency of the armature reaction and field distortion would be to relatively decrease the output of the dynamo. If the lamps are lighted, current will also flow through the wire 13ª and the series windings *c*, and these windings will increase the magnetization of the regulating poles N' and S' and augment the effect of the shunt windings *b*, thus strengthening the M. M. F. of the regulating poles and setting up increased opposition to the armature reaction and thereby further cutting down the amount of field distortion, to maintain the efficiency of the machine and hold up the output. The augmenting effect of the series windings *c* is in direct proportion to the consumption in the circuit F, that is to say, is in direct proportion to the amount of current demanded by the number of lamps in use. It will be seen from this brief description of the construction and operation of the dynamo that the output of the dynamo will be in direct proportion to the demands of the consuming circuits, and any variation, either by way of increase or decrease, of the demands of the consuming circuits will effect a corresponding alteration of the dynamo output. The correct output is thus maintained without the interposition of complicated regulating mechanism, and the dynamo is efficient in operation.

Turning now to my improved adaptation of this dynamo in connection with a car lighting system and with means for preventing overcharge, it will be seen that I have provided in the negative return 14 a measuring instrument such as an ampere hour meter D, such ampere hour meter being provided with the contacts 19 which serve to interrupt a relay circuit completed by the wire 20 connected to the positive 13 and also to the negative 14. The needle of the ampere hour meter is adapted to close the contacts 19 and complete the circuit of the relay, there being an operating coil 21 located in such relay and adapted to attract the core 22 of the relay switch B. The relay coil 21 being connected across the battery, as above indicated, is impressed with the battery voltage and may be calibrated so as to attract the core 22 the instant the needle of the ampere hour meter bridges the contacts 19, or it may be so calibrated that it is only sufficiently energized to attract the core 22 when the battery reaches a state of full charge. When the core 22 is attracted, the relay switch B is opened, thus breaking the circuit of the shunt windings *b*, as a result of which the opposing field set up by the regulating poles N' and S' is largely reduced or entirely wiped out, depending upon whether or not any translating devices are in use. The effect of this is that there is reduced or no opposition to armature reaction and field distortion, and the output of the dynamo drops off so that further charging of the battery substantially ceases, and no harmful overcharging of the battery can take place. At the same time, however, the dynamo will be able to supply the lamps and furthermore, the operation of the relay does not interfere with the automatic regulating functions of the dynamo in supplying the varying demands of the consuming circuits. That this is so will be apparent from the fact that if at the time the relay operates, any lamps be on, or if lamps be turned on thereafter, the series windings *c* will magnetize the regulating poles and set up a field opposing the armature reaction field and cutting down the field distortion. The effect of the series coils *c* will be in direct proportion to the demands of the external circuit, so that the output of the dynamo will be maintained at the proper standard.

When a predetermined number of ampere hours have been discharged from the battery, or the battery voltage drops below the critical point, then the relay switch B will close, reëstablishing the circuit of the shunt windings *b* and thus restoring normal operative conditions.

If desired, instead of completely breaking the circuit of the shunt windings *b*, the relay switch B may be so arranged that a resistance 23 is inserted into the circuit of the windings *b*, and this resistance may be given any predetermined value, preferably a value such as will substantially obliterate the effect of the windings *b*. (See Fig. 2).

It will be seen from the foregoing that I have so arranged the system that I am enabled to retain all of the benefits and advantages to be derived from the use of a self-regulating dynamo, while at the same time I protect the battery from harmful overcharging, and this without substantial impairment of the functions of the dynamo. It will of course be understood that in the diagram I have shown a system in its simplest form; modifications thereof may be readily made without departing from the spirit of my invention. It will also be obvious that my invention is not necessarily limited to the particular type of self-regulating dynamo shown, my invention consisting of a novel departure in the elements to be affected to secure the desired results.

Figure 3:
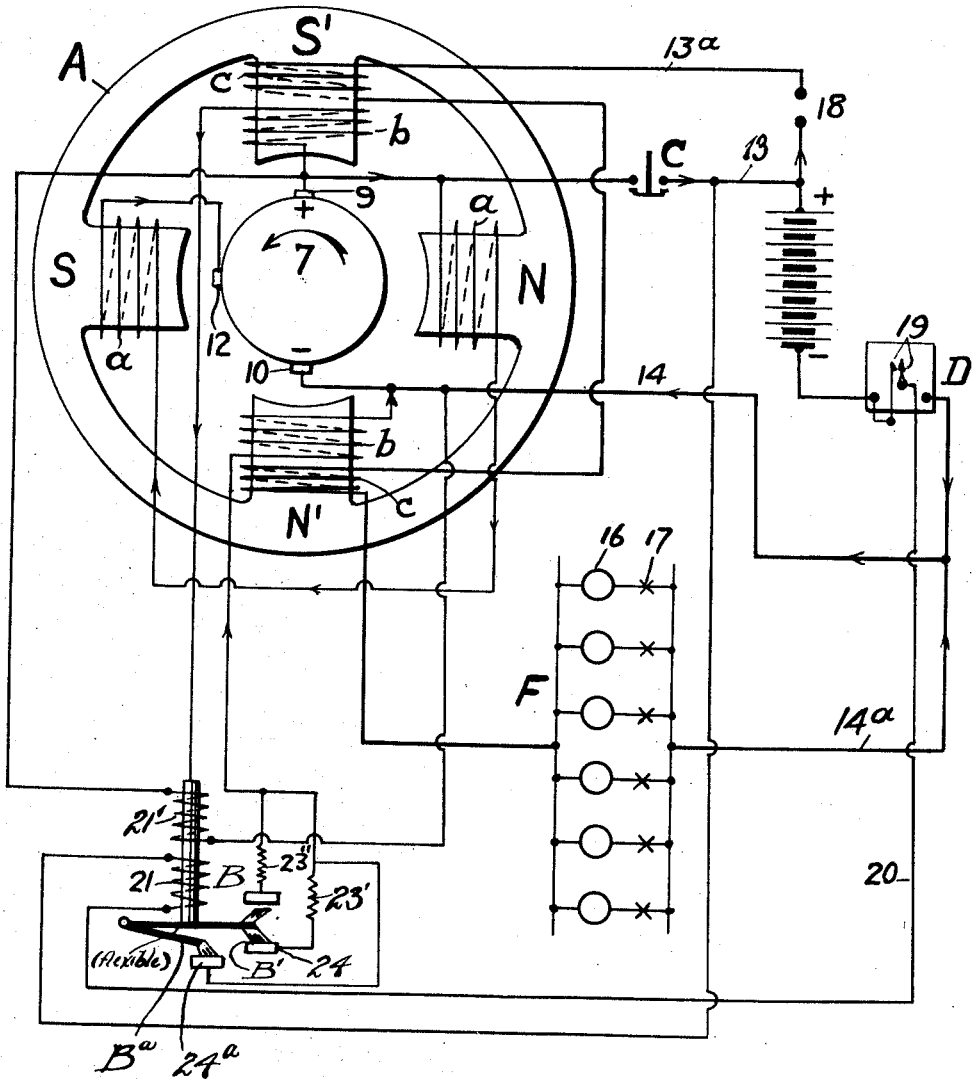

In Fig. 3 I have shown one modification of my system, the same being in all substantial respects identical with that shown in Fig. 1, save that the relay switch B is provided with a second coil 21′ in addition to the coil 21, previously described. This second coil is connected across the generator and the switch is so calibrated as to sensitively respond to change in voltage.

The operation is as follows: the switch B is normally in the position indicated and there is no resistance in the circuit of the winding $b$. As soon as the train starts to move, the dynamo is subjected to the full effect of the windings $b$, as a result of which the dynamo rapidly builds up and delivers a charging current of a high rate to the batteries, thus insuring prompt charging thereof. When the voltage in the system rises, say for example about 42 volts, the coil 21′ is sufficiently impressed to partially raise the core of the switch B and lift the brush $B^a$ out of contact with contact $24^s$, thus inserting into the circuit of the winding $b$, a predetermined resistance 23′, such resistance being given a value which will reduce the effect of the regulating poles a predetermined amount, with the resultant drop in the output of the dynamo. This result is achieved by making the brush B′ flexible, so that it will remain in contact with contact 24 when the core is raised in an amount sufficient to lift $B^a$ out of contact. Stated in other words, the arrangement is such that during initial starting up, a high standard or rate of charge is maintained in order to quickly charge the batteries; and after a predetermined amount of current has been put into the batteries the standard or rate of charge will be lowered, thus preventing harmful charging of the battery while at the same time permitting the dynamo to supply the lamps. Thereafter when the batteries have been charged a predetermined amount, at a lower rate, the circuit of the relay coil 21 will be completed at the ampere hour meter, as a result of which the coil 21 will assist the coil 21′ and lift the core still farther so that the contact between brush B′ and contact 24 is broken. This movement can be utilized to completely break the circuit of the windings $b$, as shown in Fig. 1, or to insert a second resistance 23″ of such a value as to substantially obliterate the effect of windings $b$, as shown in Fig. 2, thus reducing the output of the dynamo to such a point that further charging substantially ceases. No difficulties will be encountered in release of the switch B, if this switch be designed so as to be sensitive to change in voltage conditions.

This type of equipment will be very useful in trains which are used in local service, with frequent points of stoppage, in which service it is desirable to have a high initial standard of charge. It will also be adapted to service in which the trains are indiscriminately used in both local and through service, because if used in through service with infrequent points of stoppage, the higher rate of charge will soon be automatically lowered so that harmful overcharging cannot take place.

I claim:—

1. In a car lighting system, the combination of a dynamo having a regulating pole, a battery to be charged, a consuming circuit, a winding on said pole in series with the consuming circuit, a second winding on said pole, and means under the control of battery voltage for rendering said second winding substantially ineffective.

2. In a car lighting system, the combination with a dynamo having a regulating winding, a battery to be charged, a relay switch normally completing the circuit of said winding, a resistance adapted to be inserted in the circuit of said winding, and operating coils for said switch, one of said coils being voltage operated to insert said resistance and the circuit of the other coil being completed after the battery has been charged a predetermined amount, said last mentioned coil being adapted to break the circuit of said winding.

3. In a car lighting system, the combination of a dynamo having a regulating pole, a battery to be charged, a consuming circuit, a winding on said pole in series with the consuming circuit, a second winding on said pole, and means under the control of battery voltage for modifying the effect of one of said windings.

4. In a car lighting system, the combination of a dynamo having a regulating pole, a battery to be charged, a consuming circuit, a winding on said pole in series with the consuming circuit, a second winding on said pole, a relay for modifying the effect of one of said windings, the circuit of which is normally broken, and means under the control of battery voltage for establishing the circuit of the relay.

In testimony whereof I have hereunto signed my name.

H. D. ROHMAN.